US010288216B1

(12) United States Patent
Amanze et al.

(10) Patent No.: US 10,288,216 B1
(45) Date of Patent: May 14, 2019

(54) SUPPORT FIXTURE (71) Applicants: Charles U Amanze, West Bloomfield, MI (US); Onyakachi Charles Amanze, West Bloomfield, MI (US); Onyabuchi Charles Amanze, West Bloomfield, MI (US); Onyenachi Charles Amanze, West Bloomfield, MI (US); Chikodi Charles Amanze, West Bloomfield, MI (US); Chiemerie Jovita Amanze, West Bloomfield, MI (US)

(72) Inventors: Charles U Amanze, West Bloomfield, MI (US); Onyakachi Charles Amanze, West Bloomfield, MI (US); Onyabuchi Charles Amanze, West Bloomfield, MI (US); Onyenachi Charles Amanze, West Bloomfield, MI (US); Chikodi Charles Amanze, West Bloomfield, MI (US); Chiemerie Jovita Amanze, West Bloomfield, MI (US)

(*) Notice: Subject to any disclaimer, the term of this patent is extended or adjusted under 35 U.S.C. 154(b) by 208 days.

(21) Appl. No.: 15/243,936

(22) Filed: Sep. 2, 2016

(51) Int. Cl.
*F16M 11/38* (2006.01)
*F16M 11/16* (2006.01)
*G09F 7/18* (2006.01)

(52) U.S. Cl.
CPC ............. *F16M 11/38* (2013.01); *F16M 11/16* (2013.01); *G09F 7/18* (2013.01)

(58) Field of Classification Search
CPC ........ F16M 11/38; F16M 11/16; F16M 11/26; G09F 7/18

USPC .... 248/472, 473, 302, 218.4, 351, 465, 455, 248/170, 150; 473/238, 282; 294/58, 59
See application file for complete search history.

(56) References Cited

U.S. PATENT DOCUMENTS

| | | | | | |
|---|---|---|---|---|---|
| 236,371 | A | * | 1/1881 | Somers | A47J 27/04 248/463 |
| 245,485 | A | * | 8/1881 | Haff | F16M 11/00 248/463 |
| 250,229 | A | * | 11/1881 | Gollner | A47G 1/16 248/463 |
| 253,457 | A | * | 2/1882 | Wiederer | F16M 11/00 248/463 |
| 1,113,034 | A | * | 10/1914 | La Miller | A47G 1/16 248/160 |
| 1,713,077 | A | * | 5/1929 | Frizl | B44D 3/123 248/691 |
| 1,752,400 | A | * | 4/1930 | Sund | A46B 17/08 15/246 |
| 2,419,015 | A | * | 4/1947 | Gascoigne | A01B 1/04 254/131.5 |

(Continued)

*Primary Examiner* — Nkeisha Smith (57) ABSTRACT

A support fixture that can be securely attached to a work implement such as mops, push brushes, long handled paint rollers, shovels, garden rakes, leaf rakes, squeegees, long handled trowels, vacuum cleaner wands, walking sticks, long handled shears and other long handled tools, includes a mounting bracket and a standing leg. The standing leg is hingedly engaged into the mounting bracket. The support fixture is light in weight and weather resistant and substantially aids the work implement to stand alone uprightly and in a stable position when the work implement is not operational. When the work implement is operational, the standing leg may be adjustably flipped upwards to prevent any obstruction of the operations of the work implement.

4 Claims, 8 Drawing Sheets

(56) References Cited

U.S. PATENT DOCUMENTS

| | | | | |
|---|---|---|---|---|
| 3,990,670 A * | 11/1976 | Frechtman | A47G 1/22 248/463 |
| 4,461,458 A * | 7/1984 | Poulin | A01B 1/028 254/131.5 |
| 4,519,566 A * | 5/1985 | Manzi | B25H 3/006 248/110 |
| 4,722,512 A * | 2/1988 | Lighthizer | A01B 1/028 254/131.5 |
| 5,098,056 A * | 3/1992 | Alger | A47G 1/143 248/463 |
| 5,413,329 A * | 5/1995 | Hirsch | A63B 55/10 211/70.2 |
| 5,496,085 A * | 3/1996 | Middleton | A01B 1/026 16/426 |
| 5,673,718 A * | 10/1997 | Kennedy | A63B 55/10 135/16 |
| 5,878,563 A * | 3/1999 | Dutcher | A01D 7/00 56/400.04 |
| 6,651,943 B2 * | 11/2003 | Cho | F16M 11/105 248/122.1 |
| 6,955,609 B1 * | 10/2005 | Hiltner, Jr. | A63B 55/10 116/173 |
| 7,052,058 B2 * | 5/2006 | Olinski | A01D 9/00 254/131.5 |
| 7,392,967 B2 * | 7/2008 | Liaw | F21V 21/088 248/188.1 |
| 7,686,277 B2 * | 3/2010 | Westgarde | A01B 1/00 248/530 |
| 8,714,497 B2 * | 5/2014 | Bricker | B25B 11/00 172/371 |
| 8,757,688 B1 * | 6/2014 | Hajek | A01B 1/026 294/57 |
| 9,302,386 B1 * | 4/2016 | Amanze | B25G 1/06 |
| 9,540,781 B2 * | 1/2017 | Adams | E01H 5/02 |
| 2008/0083681 A1 * | 4/2008 | Cella | B25H 3/006 211/70.6 |
| 2008/0135696 A1 * | 6/2008 | LeMay | B25H 3/006 248/170 |
| 2009/0042662 A1 * | 2/2009 | Staszak | A63B 55/10 473/282 |
| 2012/0137548 A1 * | 6/2012 | Kimball | A01B 1/02 37/266 |

* cited by examiner

SUPPORT FIXTURE

BACKGROUND OF THE INVENTION

1. Technical Field

The present invention relates generally to supports, and more particularly, to stably and uprightly support work implements that have long handles. The present invention is an improvement over issued U.S. Pat. No. 9,302,386 to Charles U. Amanze.

2. Background of Related Arts

A continuing problem that presents itself to users of floor mops, dust mops, push brushes, long handled paint rollers, shovels, garden rakes, leaf rakes, squeegees, long handled trowels, long handled shears, vacuum cleaner wands, walking sticks, tall items which require standing stably or other items with long handles (hereinafter called work implement) is the inability or difficulty to stand them uprightly when the user is using or temporarily, and sometimes completely finished using the work implement. In such situation, the work implement will be leaned against a wall, tree or any stronger and more stable structure. When such wall, tree or stronger and more stable structure is not in close proximity such as in large gymnasiums, lawns, gardens and conference halls, the user will have no choice but place the work implement on the floor or ground. The floor or ground may be wet or dirty or full of leaves or debris. If the work implement is placed on a ground full of leaves, the user may not recognize the location when they return to resume using the work implement. Also, the user or passerby may accidently step on it or trip, causing damage or serious injuries.

Moreover, when the work implement is placed on the floor or ground, upon resumption of use, the user will be required to bend down to pick it. The process of bending down and picking up a work implement may be impossible or physically challenging to some people and cause or exacerbate existing back ache to others.

Thus far, the most common solution to the aforementioned problem has been cumbersome attachments which do not allow the work implement to be used efficiently, especially in tight spaces such as where floors meet wall corners. Hence, a more complete and satisfactory solution is still sought by many.

The disadvantages associated with the most common solutions to the aforementioned problems have made it apparent that a new technique for uprightly and stably standing work implements is needed. The new technique should be light in weight, easily adaptable and foldable or retractable when the work implement is in use, and most importantly, stand the work implement uprightly and stably when the work implement is not in use. The new technique is also required to uprightly and stably support display boards. The present invention is directed to these ends.

SUMMARY OF THE INVENTION

It is therefore an object of the present invention to provide an improved and reliable support fixture which attaches securely to a work implement. Another object of the present invention is to stand a work implement uprightly and stably. Additionally, the new technique is light in weight and weather resistant, capable of being adjustably flipped to prevent any obstruction during use of the work implements.

In accordance with the object of the present invention, a support fixture is provided. The support fixture includes a mounting bracket and a standing leg. The mounting bracket attaches the support fixture to a work implement. The standing leg is hingedly connected to the mounting bracket and extends downwards to engage with the floor, ground or support surface. The standing leg can also extend upwards to rest on the body of the work implement.

The support fixture can be built as an integral part of a work implement by the manufacturer of the implement.

The present invention is advantageous in that it uprightly stands and stably maintains the position of the work implement.

Additional advantage and features of the present invention will become apparent from the description that follows, and may be realized by the instrumentalities and combinations particularly pointed out in the appended claims, taken in conjunction with the accompanying drawings.

BRIEF DESCRIPTION OF THE DRAWINGS

In the following figures, the same reference numerals, alphabets and alphanumerals will be used to identify components in the various views. The present invention is illustrated with respect to a support fixture, particularly suited for house-hold and commercial, janitorial, educational and industrial fields. The present invention is also adaptable to various other uses that may require uprightly and stably standing long items, in which.

DETAILED DESCRIPTION OF THE PREFERRED EMBODIMENT(S)

Referring now to the figures, a conventional garden rake work implement X is shown in FIGS. 2*a*, 2*b*, 3*a* and 3*b*.

Figure 2A:
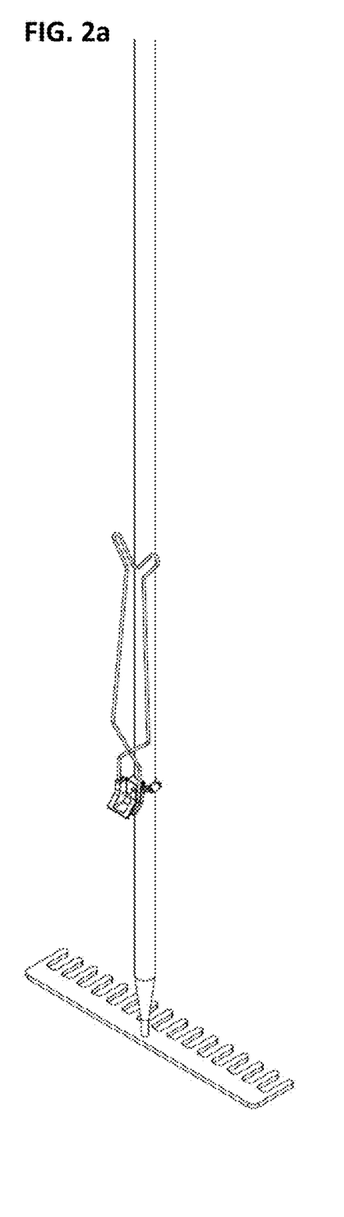
FIG. 2a is a perspective view of the clamp type support fixture mounted to a garden rake and folded upwards.
Figure 2B:
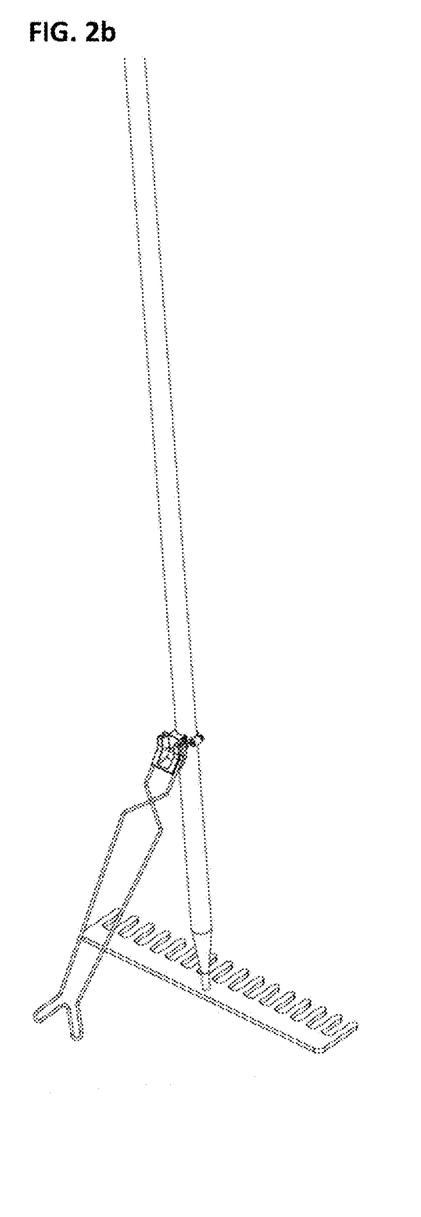
FIG. 2b is a perspective view of the clamp type support fixture mounted to a garden rake and unfolded and aiding the rake to remain upright and stable.
Figure 3A:
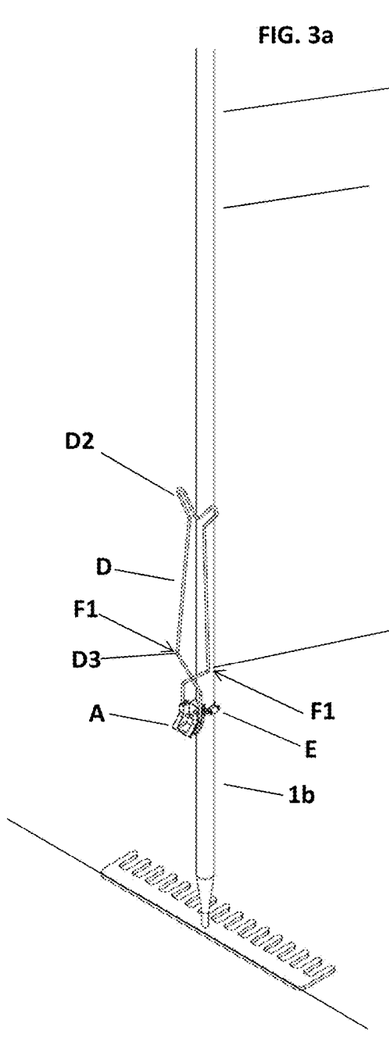
FIG. 3a is a perspective view of the clamp type support fixture mounted to a garden rake and folded, with references pointing at its components.
Figure 3B:
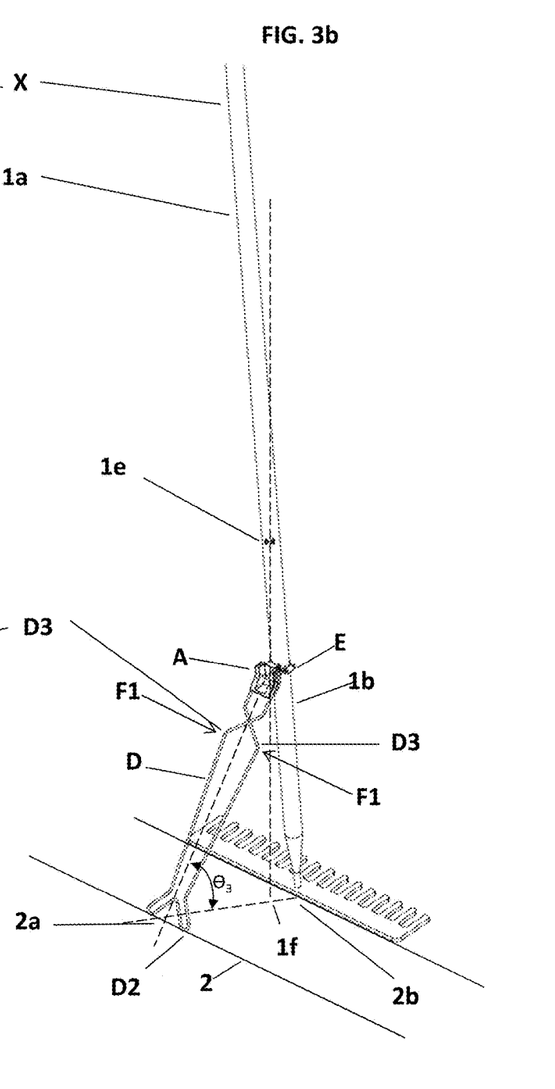
FIG. 3b is a perspective view of the clamp type support fixture mounted to a garden rake, the standing leg is unfolded, aiding the garden rake to remain upright and stable, and with references pointing at its components.

FIGS. 2*a* and 3*a* show where the present invention is folded to allow the work implement to be operational. In FIGS. 2*b* and 3*b*, the work implement X is standing uprightly and stably with the aid of the present invention.

The conventional garden rake work implement X includes a long handle with a cross section. The cross section has an upper portion handle 1*a* and a lower portion handle 1*b*. The support fixture is securely attached to the lower portion handle 1*b* of the rake's handle.

Figures 1A, 1B, 1C:
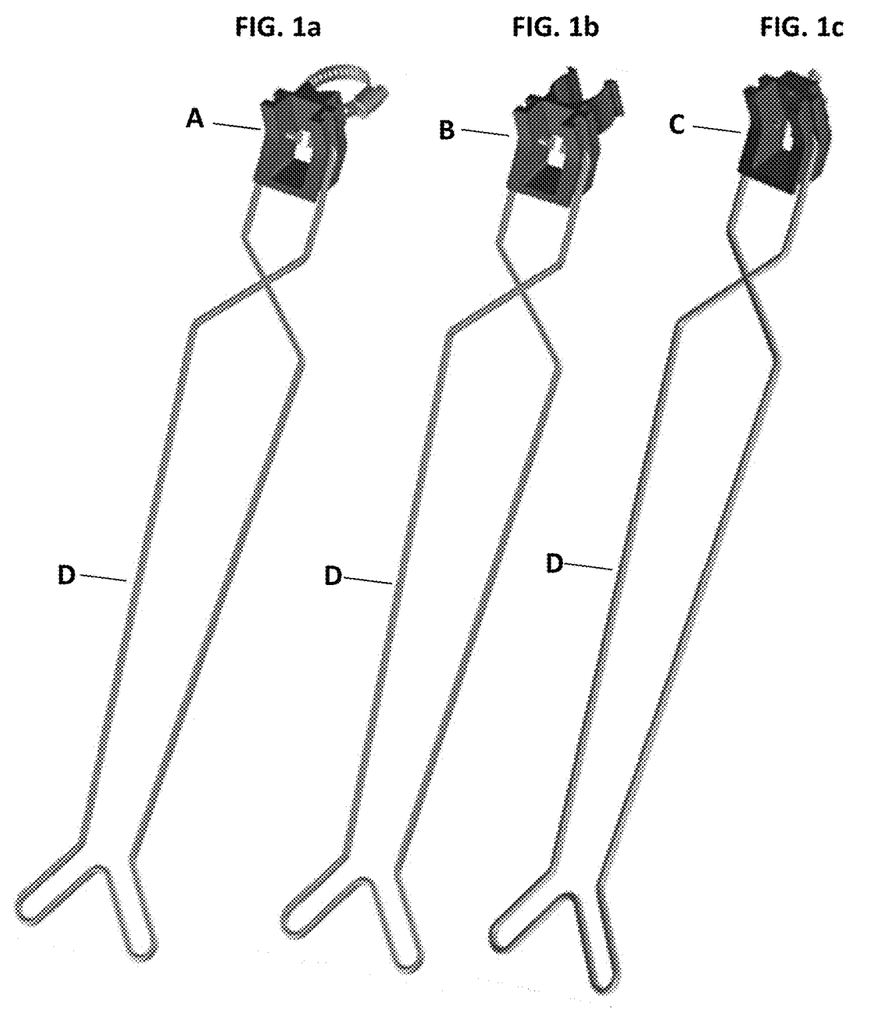
FIG. 1a is a perspective view of a clamp type support fixture.
FIG. 1b is a perspective view of a snap type support fixture.
FIG. 1c is a perspective view of a screw type support fixture.

The support fixture assembly includes a mounting bracket generally indicated as A, B or C, and a standing leg generally indicated as D. Specifically, the clamp type mounting bracket is indicated as A in FIGS. 1*a*, 2*a*, 2*b*, 3*a*, 3*b*, 6, 7 and 8. The snap type mounting bracket is indicated as B in FIGS. 1*b* and 9, and the screw type mounting bracket is indicated as C in FIGS. 1*c*, 10*a* and 10*b*.

Further in FIGS. 2*a* and 3*a*, the standing leg D is operatively adjusted upwards to rest on the work implement X when the work implement X is operational. However, some users may prefer to operate the work implement X when the standing leg D is in the downward position.

In FIGS. 3*a* and 3*b*, the standing leg D includes top ends D1 and a bottom section D2. The top ends D1 are hingedly attached to mounting bracket A. The bottom section D2 rests on a floor, ground or support surface 2 at contact points generally indicated as 2*a* in FIG. 3*b*.

Further, in FIG. 3*a*, the standing leg D is operatively adjusted upwards. In this upward position, the bottom section D2 of the standing leg D tightly rests on the handle 1*b* of the work implement X and makes the work implement X ready for use.

In FIG. 3*b*, the standing leg D is operatively adjusted downwards. In the downward position, the bottom section D2 rests on the floor, ground or support surface 2 and aids the work implement X to stand uprightly and stably.

Further in FIG. 3*b*, the work implement X is engaged with the floor, ground or support surface 2 at contacts points generally indicated as 2*b*. The center of gravity 1*e* of the work implement X lies vertically within the point 1*f* where the standing leg D is engaged with the floor, ground or support surface 2*a*, and the point where the work implement X is engaged with the floor, ground or support surface 2*b*.

The upward and downward operative adjustments of the standing leg D are achieved when the user applies equal, opposite and simultaneous forces F1 at points generally indicated as D3, then, operatively adjusts the standing leg D accordingly, and finally, releases the forces F1.

In the present invention, the standing leg D is made using stainless hard drawn spring steel rod. Other materials that exhibit the same physical properties can be used to achieve the same result. The standing leg D is of spring steel material in that when two equal and simultaneous forces F1 pointing at each other are applied at points indicated as D3, and then released, the standing leg D will return to its original free standing shape as in FIG. 4*a*.

Figures 4A, 4B:
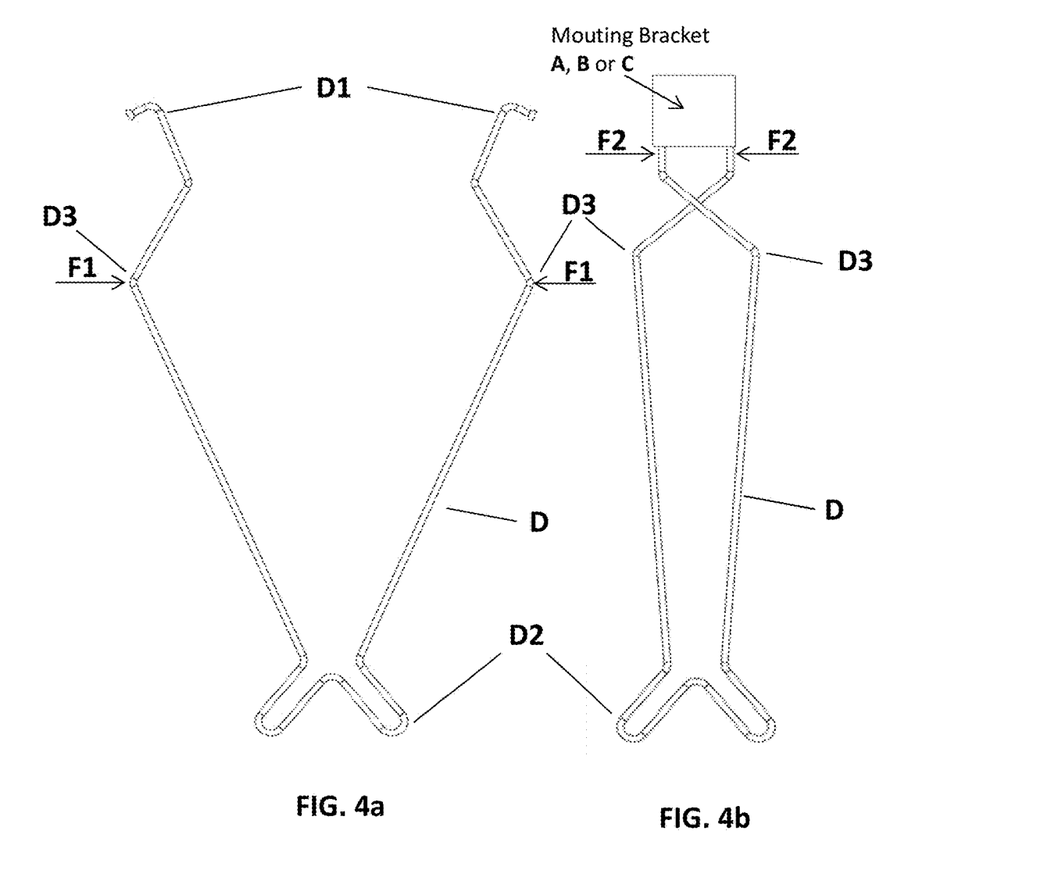
FIG. 4a is a front view of a standing leg of the support fixture before it is hingedly assembled onto a support bracket.
FIG. 4b is a front view of a standing leg of the support fixture after it is hingedly assembled onto a support bracket.

Further, FIG. 4*a* shows the standing leg D before it is hingedly engaged with the mounting bracket A, B or C and FIG. 4*b* show the standing leg D after it is hingedly engaged with the mounting bracket A, B or C.

Referring to FIGS. 4*a*, and 4*b*, the standing leg D is a long rod configured into multiple symmetrical shapes along its length. The FIGS. reveal the long rod deliberately sharped to achieve a plurality of performance characteristics, such that:
  (a) When forces F1 are applied at points indicated as D3, standing leg D is compressed horizontally;
  (b) Top ends D1 form a hinge with mounting bracket A, B or C when top ends D1 are inserted into mounting bracket A, B or C;
  (c) Standing leg D produces enough forces F2 used to clamp onto both sides of the mounting bracket A, B or C;
  (d) The standing leg D is configured to have a bottom section D2 which increases the stability of the work implement X during engagement with the floor, ground or support surface 2.

Figures 5A, 5B, 5C, 5D:
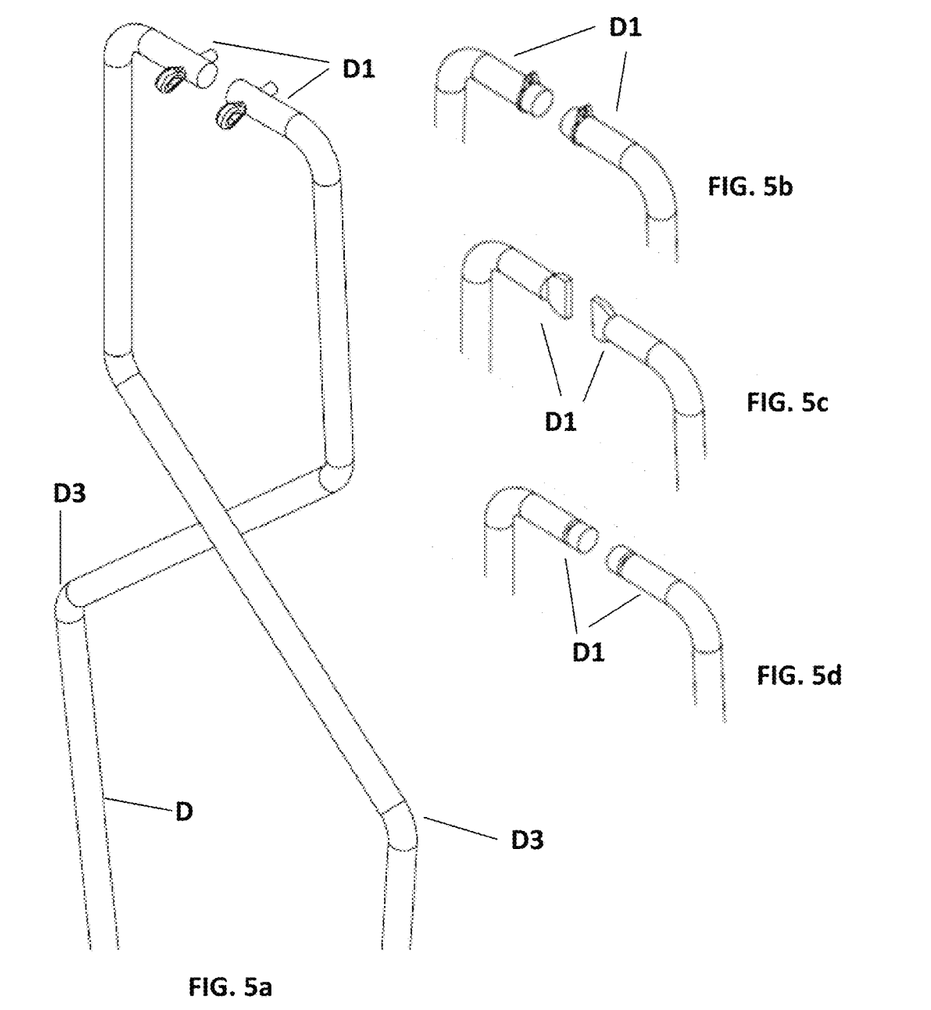
FIG. 5a is a perspective view of the standing leg of the support fixture where the top ends of the standing leg are constructed for cotter pin retention.
FIG. 5b is a perspective view of the standing leg of the support fixture where the top ends of the standing leg are constructed for retaining clips retention.
FIG. 5c is a perspective view of the standing leg of the support fixture where the top ends of the standing leg are constructed with coining compression.
FIG. 5d is a perspective view of the standing leg of the support fixture where the top ends of the standing leg are constructed for e-clips retaining.
Figures 6, 7:
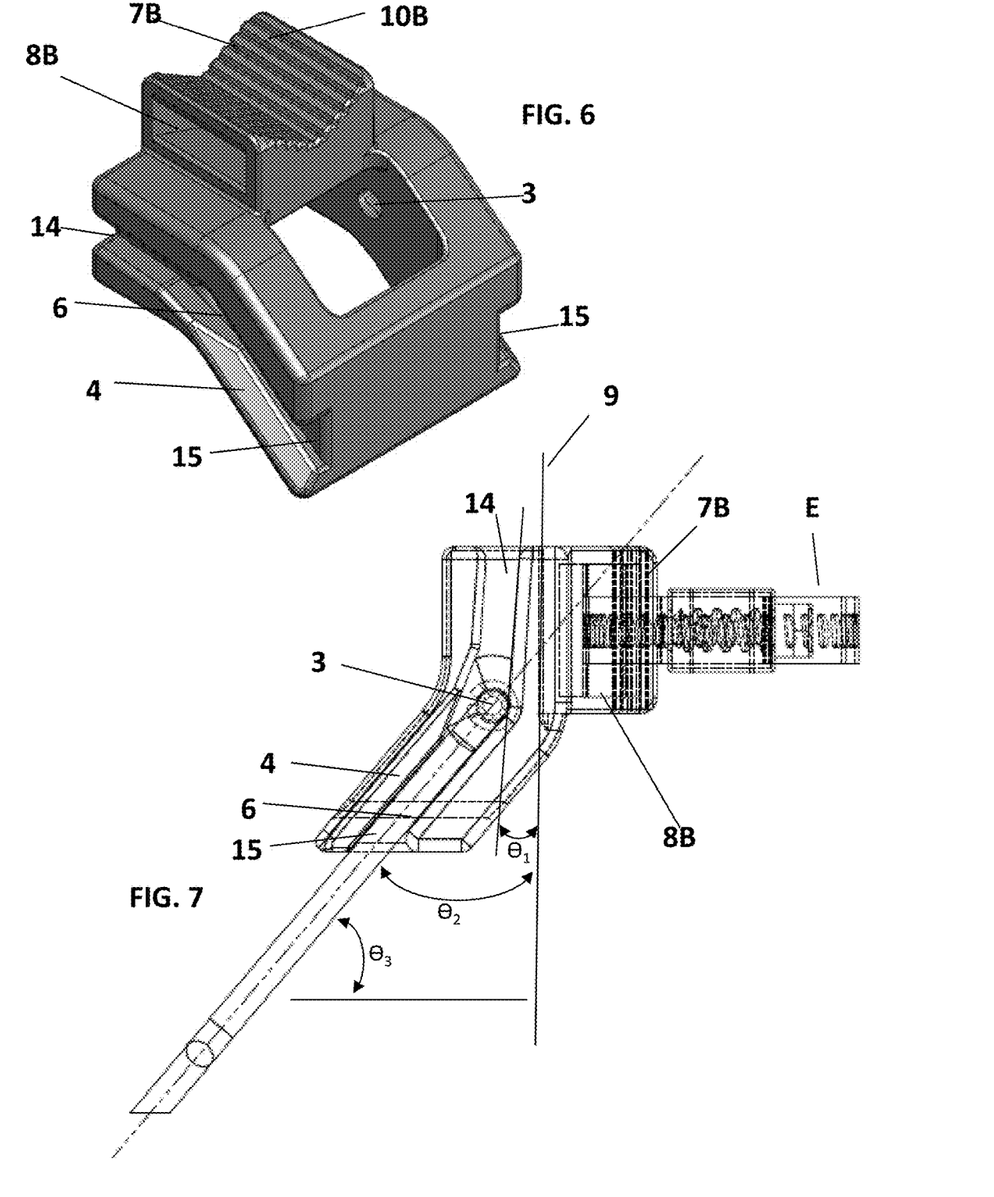
FIG. 6 is a perspective view of the clamp type mounting bracket embodiment of the support fixture showing a safety disengagement slot system.
FIG. 7 is a sectional view of a side of the clamp type support fixture.

Mounting brackets A, B or C has through holes 3 as shown in FIGS. 6 and 7. In order to prevent the standing leg D from disengagement from the through holes 3 during the application of forces F1, the top ends D1 are constructed according to FIG. 5*a*, 5*b*, 5*c* or 5*d*. FIG. 5*a* shows how the top ends D1 of the standing leg D is constructed for cotter pin retention. FIG. 5*b* shows how the top ends D1 of the standing leg D is constructed for retaining pin retention. FIG. 5*c* shows how the top ends D1 of the standing leg D is constructed for coining compression retention. FIG. 5*d* shows how the top ends D1 of the standing leg D is constructed for e-dips retention.

While the top ends D1 are constructed as shown in FIG. 5*a*, 5*b*, 5*c* or 5*d*, those having ordinary skill in the arts will appreciate that other methods of construction are possible to prevent the disengagement of top ends D1 from through holes 3.

Figures 8, 9:
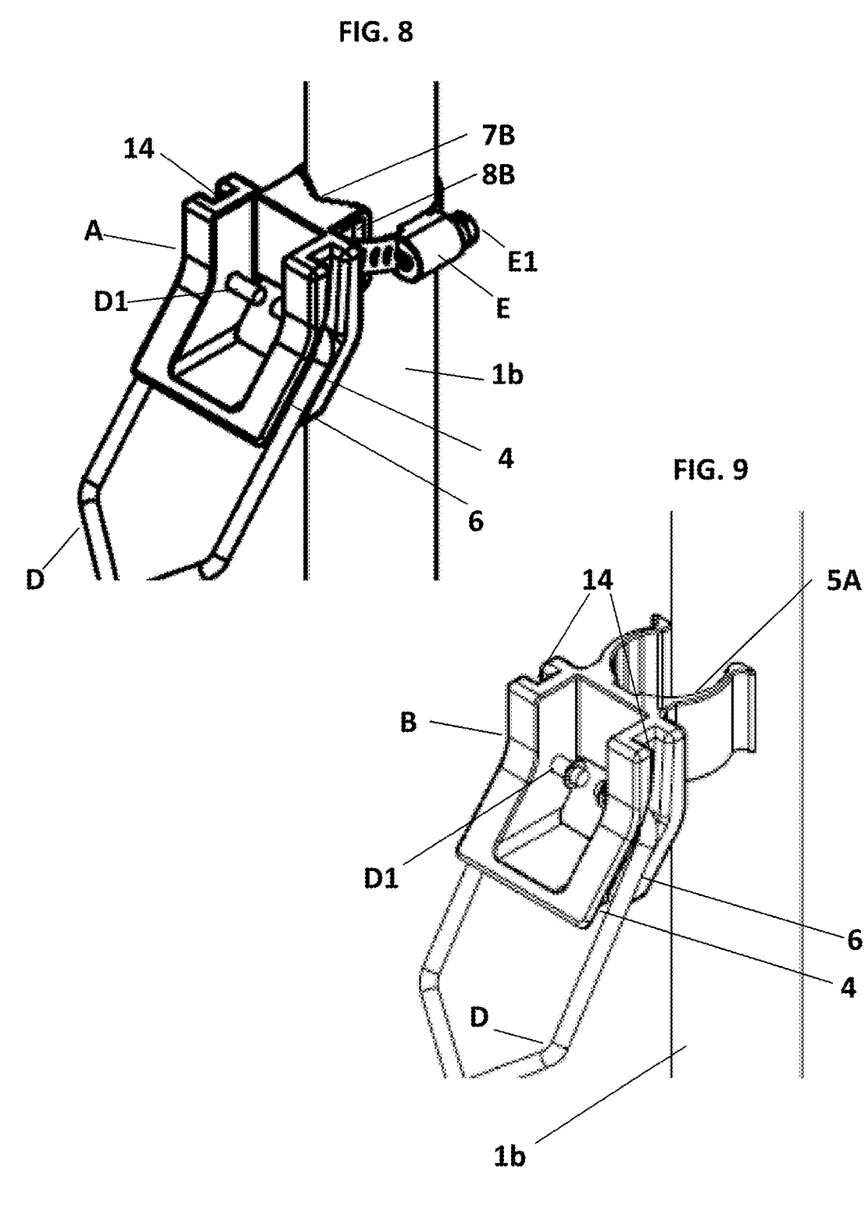
FIG. 8 is a perspective view of the clamp type mounting bracket embodiment of the support fixture when it is attached with a clamp to the handle of a long handled tool.
FIG. 9 is a perspective view of the snap type mounting bracket embodiment of the support fixture demonstrating how it can be snapped to the handle of a long handled tool.

FIGS. 6, 7 and 8 reveal some essential features of the clamp type mounting bracket A. Cavity 7B is configured to accept different types and sizes of implement handles 1*b*. Vertical grooves 10B are carved along the surface of the cavity 7B to allow the mounting bracket A to grip more tightly as fastener means clamp E is fastened.

Another important feature of the support fixture is depicted on top slot wall 4, shown in FIG. 6. Top slot wall 4 is configured such that when there is excessive force on mounting bracket A, B or C, enough to bend or damage standing leg D, the standing leg D will disengage from top slot wall 4. The disengagement is a safety measure that prevents the standing leg D from bending or damaging.

Side sectional view shown in FIG. 7 is used to further illustrate additional advantages of the present invention. Mounting bracket A, B or C has a pair of bottom slot 15 and a pair of top slot 14. Both bottom slot 15 and top slot 14 coincide and are perpendicular with through holes 3. On one side of the mounting bracket A, B or C, one bottom slot 15 and one top slot 14 form a continuous slot. On the other side of the mounting bracket A, B or C, one bottom slot 15 and one top slot 14 form another continuous slot. Standing led D is guided by top slot 14 when standing leg D is folded as in the upwards position. Standing leg D is guided by bottom slot 15 when standing leg D is unfolded as in the downwards position.

Top slots 14 are constructed to maintain an acute angle 81 relative to vertical sides 9. The acute angle 91 enables the standing leg D to rest tightly on the handle 16 of the work implement X when the implement X is operational.

Bottom slots 15 are constructed to maintain an acute angle 63 relative to vertical sides 9. The acute angle 82 enables the standing leg D to maintain a stable stance with the work implement X.

In FIG. 8, the fastener means such as clamp E is shown and it is used to securely attach the clamp type mounting bracket A onto the handle 16. Clamp E is inserted into one end of a rectangular clamp slot generally indicated as 8B. Upon emerging from the other side of the slot 8B, the clamp E wraps around handle 1b. By adjustably tightening clamp screw E1, the clamp type mounting bracket A firmly grips handle 16.

FIG. 9 illustrates the snap type mounting brackets B. The snap type mounting bracket B has cavity 5A as fastener means to receive the lower portion or handle 16 of the work implement X. Size and shape of the cavity 5A are constructed to easily accept and tightly grip the handle 16.

While the work implement X is shown and described to be attached with support fixture having the clamp type A or snap type B mounting brackets, those having ordinary skill in the art will appreciate that attaching the support fixture can be achieved using other methods. Thus, it will be understood that the present invention is not limited to attachment using only the clamp type mounting bracket A or the snap type mounting bracket B.

Figures 10A, 10B:
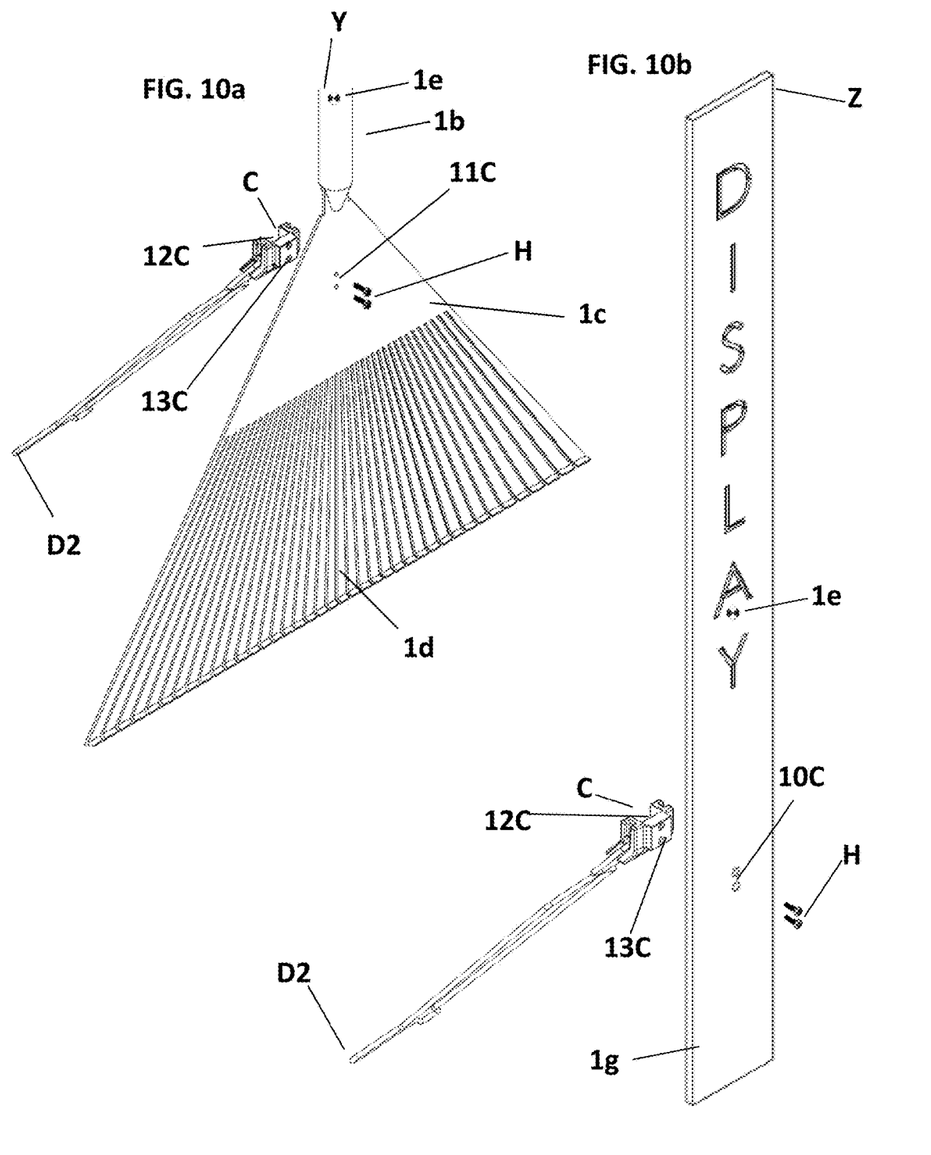
FIG. 10*a* is a perspective view of the screw type support fixture showing how it can be mounted to a leaf rake and unfolded while aiding the rake to remain upright and stable.
FIG. 10*b* is a perspective view of the screw type support fixture showing how it can be mounted to a flat item such as display board and unfolded while aiding the display board to remain upright and stable.

As an example, in FIG. 10a, another embodiment of the support fixture is shown using conventional screws H as fastener means for mounting the screw type mounting bracket C. The screw type mounting bracket C is adequately designed for work implements with frames 1c, such as leaf rakes Y. FIG. 10a also shows a leaf rake Y with tall flexible prongs 1d extending from its frame 1c. The screw type mounting bracket C is secured at the center of the frame 1c along its vertical axis as indicated by frame holes 11C. A plurality of mounting holes 13C is located at the center of the screw type mounting bracket C. Threaded insert 12C forms an integral part of the mounting holes 13C. The mounting screws H are inserted in frame holes 11C from the front side of the leaf rake Y. The mounting screws H engage onto the threaded inserts 12C and are operatively tightened. Engagement of the mounting screws H and operatively tightening same firmly secures the screw type mounting bracket C on the frame 1c of the leaf rake Y.

While the support fixture assembly illustrated thus far are shown in connection with conventional rakes, those having ordinary skill in the art will appreciate that the support fixture may be employed to other tools and items, such as long handled paint rollers, shovels, squeegees, long handled trowels, vacuum cleaner wands, walking sticks, long handled shears and others. Thus, it will be understood that the present invention is not limited for use solely in connection with tool implements with long handles, but for use in all applications where stable upright standing are required.

Another example where the screw type mounting bracket C can be used is shown in FIG. 10b. Mounting screws H is inserted into mounting holes 10C on frame 1g of a flat item such as a display board Z. Using a conventional screw driver (not shown), the mounting screws H are operatively fastened into threaded insert 12C. The operation secures the screw type mounting bracket C onto the board Z.

Mounting bracket C can also be secured to frame 1c or 1g using conventional screws H and conventional nuts (not shown).

While one mounting bracket A, B or C has been shown in this disclosure to aid the standing of one item such as X, Y or Z, anyone skilled in the arts will appreciate that a plurality of support fixtures can be used to stand wide items.

TABLE 1 shows a few embodiments of the present invention relative to how they are used to aid some work implements and other items.

TABLE 1

Different fixture mounting brackets with different support applications.

| | | Mounting Bracket Types | | |
|---|---|---|---|---|
| | | Clamp (A) | Snap (B) | Screw (C) |
| Applications | Tools with long handles (X) | ✓ | ✓ | |
| | Tools with frames (Y) | | | ✓ |
| | Other items with frames (Z) | | | ✓ |

All of the aforementioned mounting brackets A, B and C are preferably made with light weight and weather resistant materials.

What is claimed is:

1. A support fixture in combination with a work implement (X, Y, Z) to uprightly and stably stand said work implement (X, Y, Z), and said support fixture comprising,
   (a) a mounting bracket (A, B, C) securely attached to a handle (1b) of said work implement (X, Y, Z), said work implement (X, Y, Z) having a center of gravity (1e);
   (b) a standing leg (D) symmetrically configured and shaped along its length, said standing leg (D) having a top section with end tips (D1), said end tips (D1) are hingedly attached to said mounting bracket (A, B, C), and a bottom section (D2) for engagement with a floor, ground or support surface (2); said standing leg (D) having an upper left end that is directly attached to a left slot on a left side of the mounting bracket, wherein a bottom arm of the left slot is tapered downward to allow disconnection of the upper left end of the standing leg (D); and said standing leg (D) having an upper right end that is directly attached to a right slot on a right side of the mounting bracket, wherein a bottom arm of the right slot is tapered downward to allow disconnection of the upper right end of the standing leg; wherein, said downward tapered left slot and downward tapered right slot are constructed to disengage said standing leg (D) to prevent said standing leg (D) from damage when excessive force is placed on said standing leg (D);
   (c) a plurality of end caps (G) securely attached to said end tips (D1) to prevent said standing leg (D) from disengagement from said mounting bracket (A, B, C); said standing leg (D) is operatively and frictionally flipped upwards when said work implement (X, Y, Z) is operational, and said standing leg (D) is operatively and frictionally flipped downwards when said work implement (X, Y, Z) is not operational; and,
   both the standing leg (D) and the work implement (X, Y, Z) are engaged on said floor, ground or support surface (2), and said standing leg (D) remains at an acute angle (θ3) relative to said floor, ground or support surface (2) such that the center of gravity (1e) of said work implement (X, Y, Z) lies between point (1f) where the work implement (X, Y, Z) is engaged with the floor, ground or support surface (2b) and where the standing leg (D) is engaged with the floor, ground or support surface (2a).

2. A support fixture as set forth in claim 1 wherein said mounting bracket (A) includes a snap cavity (5A) for securing said mounting bracket (A) onto said handle (1b) of said work implement (X, Y, Z), said snap cavity (5A) is configured to easily accepts and tightly grips said handle (1b).

3. A support fixture as set forth in claim 1 wherein, said mounting bracket (B) includes a flat hole (8B) and a clamp (E); said clamp (E) has a clamp screw (E1); said clamp (E) is inserted into said flat hole (8B) and wraps around said handle (1b); and, said clamp screw (E1) is operatively tightened to securely attach said mounting bracket (B) onto said handle (1b).

4. A support fixture as set forth in claim 1 wherein said mounting bracket (C) includes a plurality of conventional screws (H), wherein said screws (H) are inserted into predefined holes on said work implements (Y, Z) and said screws (H) are operatively fastened onto threaded inserts (12C) to securely attach said mounting bracket (C) onto frame (1c, 1g) of said work implement (Y, Z); and, said threaded inserts (12C) form an integral part of said mounting holes (13C).

\* \* \* \* \*

UNITED STATES PATENT AND TRADEMARK OFFICE
CERTIFICATE OF CORRECTION

| | | |
|---|---|---|
| PATENT NO. | : 10,288,216 B1 | Page 1 of 1 |
| APPLICATION NO. | : 15/243936 | |
| DATED | : May 14, 2019 | |
| INVENTOR(S) | : Amanze et al. | |

It is certified that error appears in the above-identified patent and that said Letters Patent is hereby corrected as shown below:

On the Title Page

Item (72) Inventors, the second and third inventors name should appear correctly as:
ONYEKACHI CHARLES AMANZE, West Bloomfield, MI (US);
ONYEBUCHI CHARLES AMANZE, West Bloomfield, MI (US)

Signed and Sealed this
Eleventh Day of June, 2019

Andrei Iancu
*Director of the United States Patent and Trademark Office*